Sept. 29, 1970  J. G. FRANCOIS  3,531,164
BRAKING DEVICES FOR SELF-PROPELLED VEHICLES
Filed Aug. 8, 1968  7 Sheets-Sheet 2
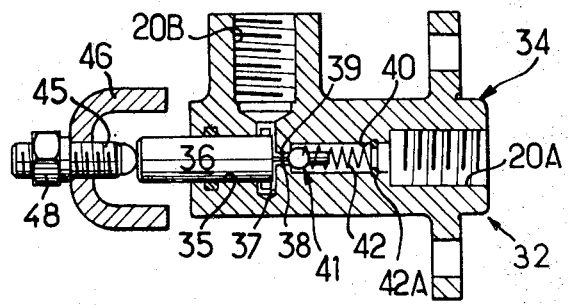
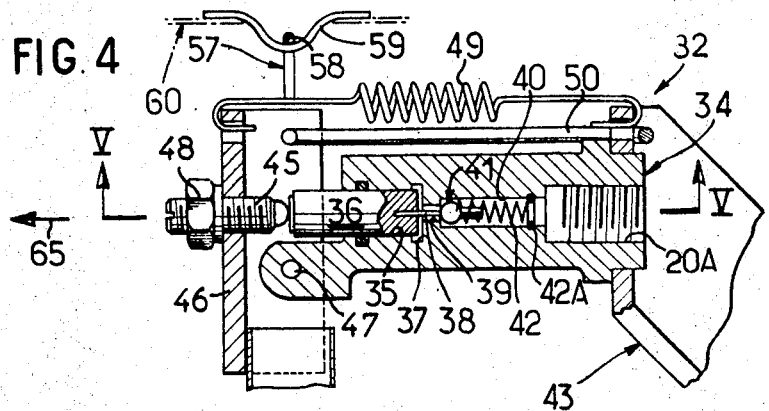
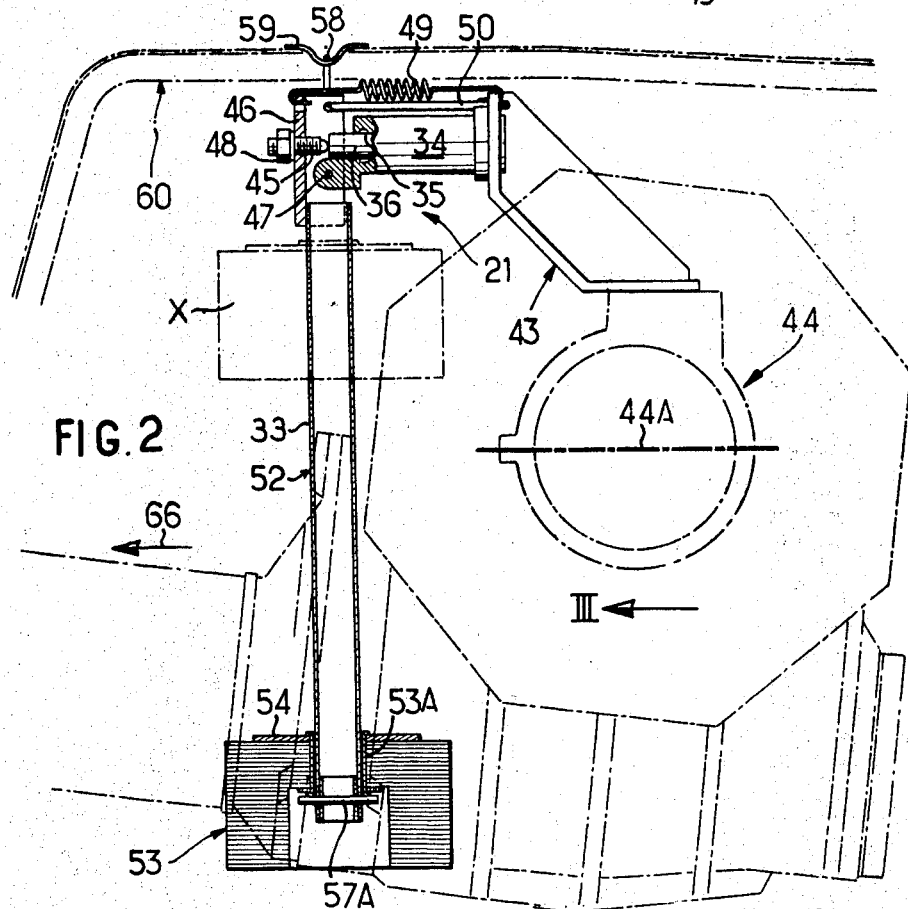
INVENTOR
JEAN GEORGES FRANCOIS
BY Young + Thompson
ATTYS.

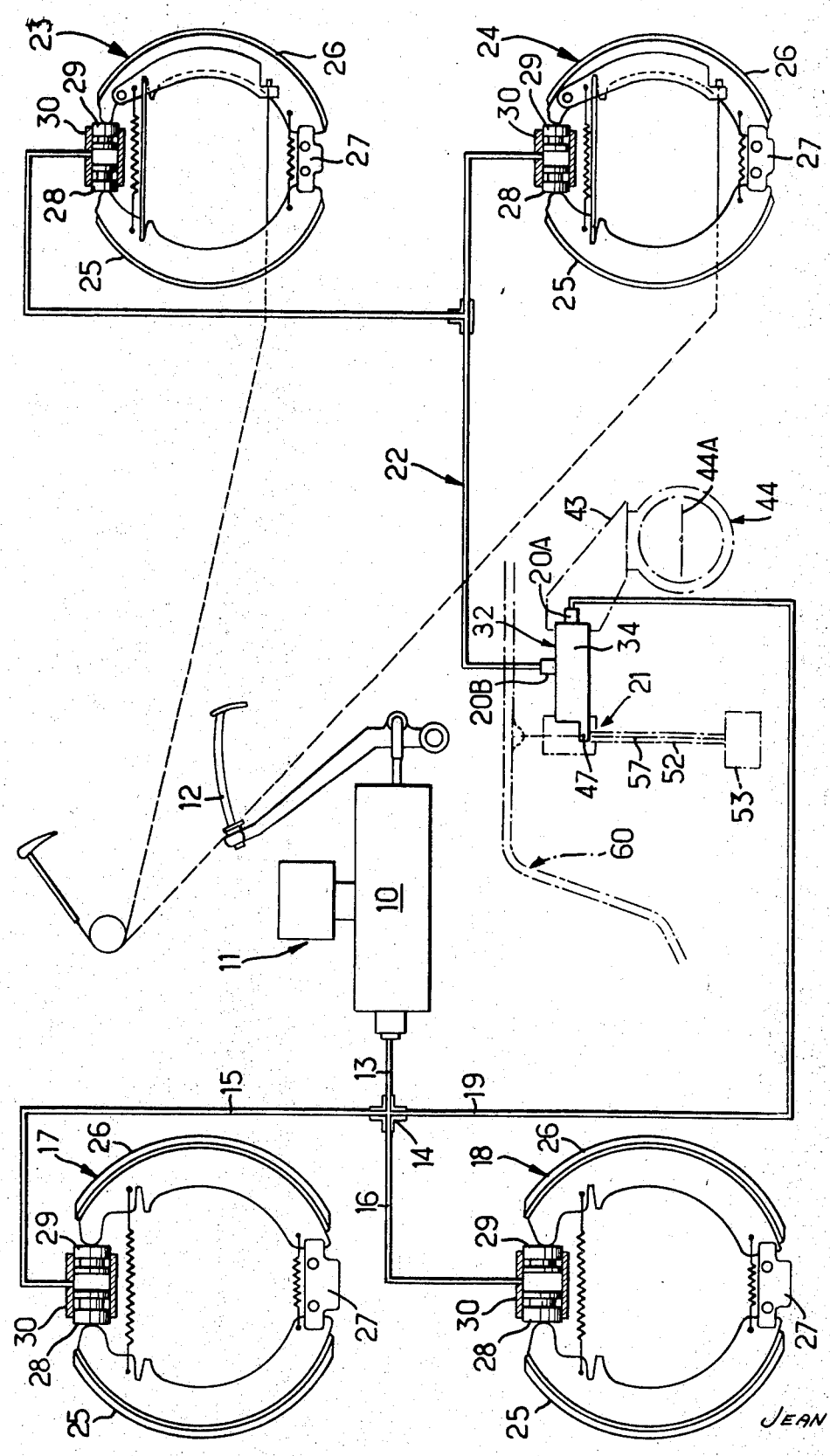

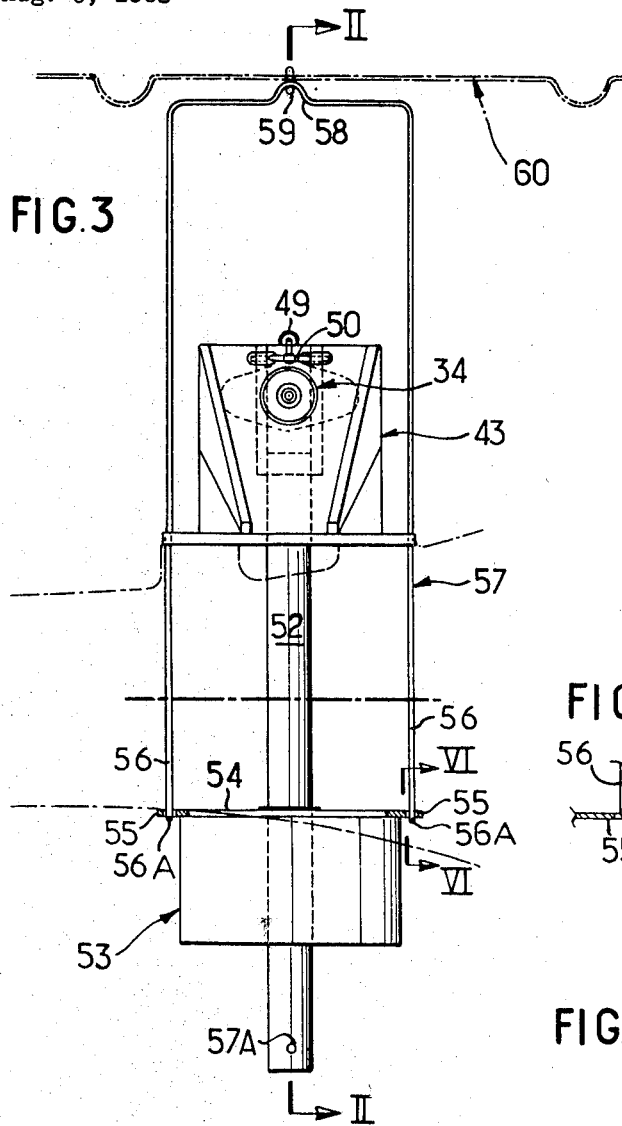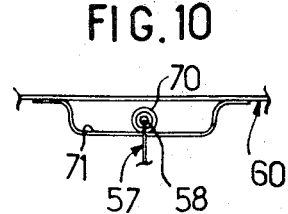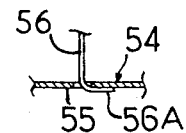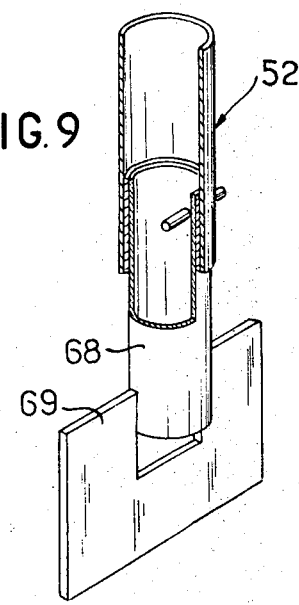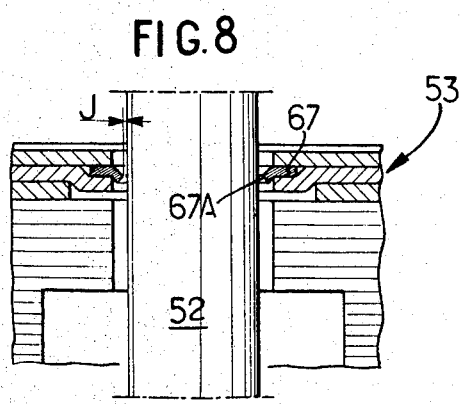

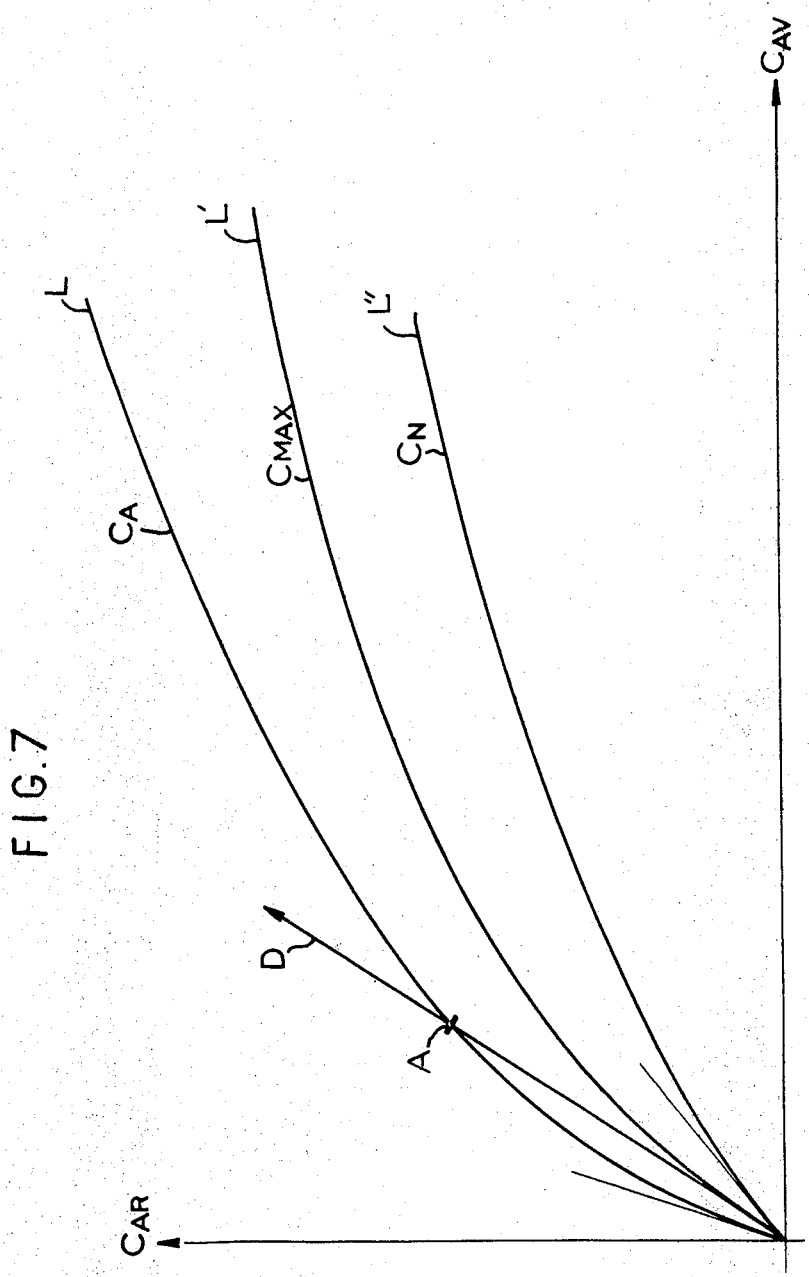

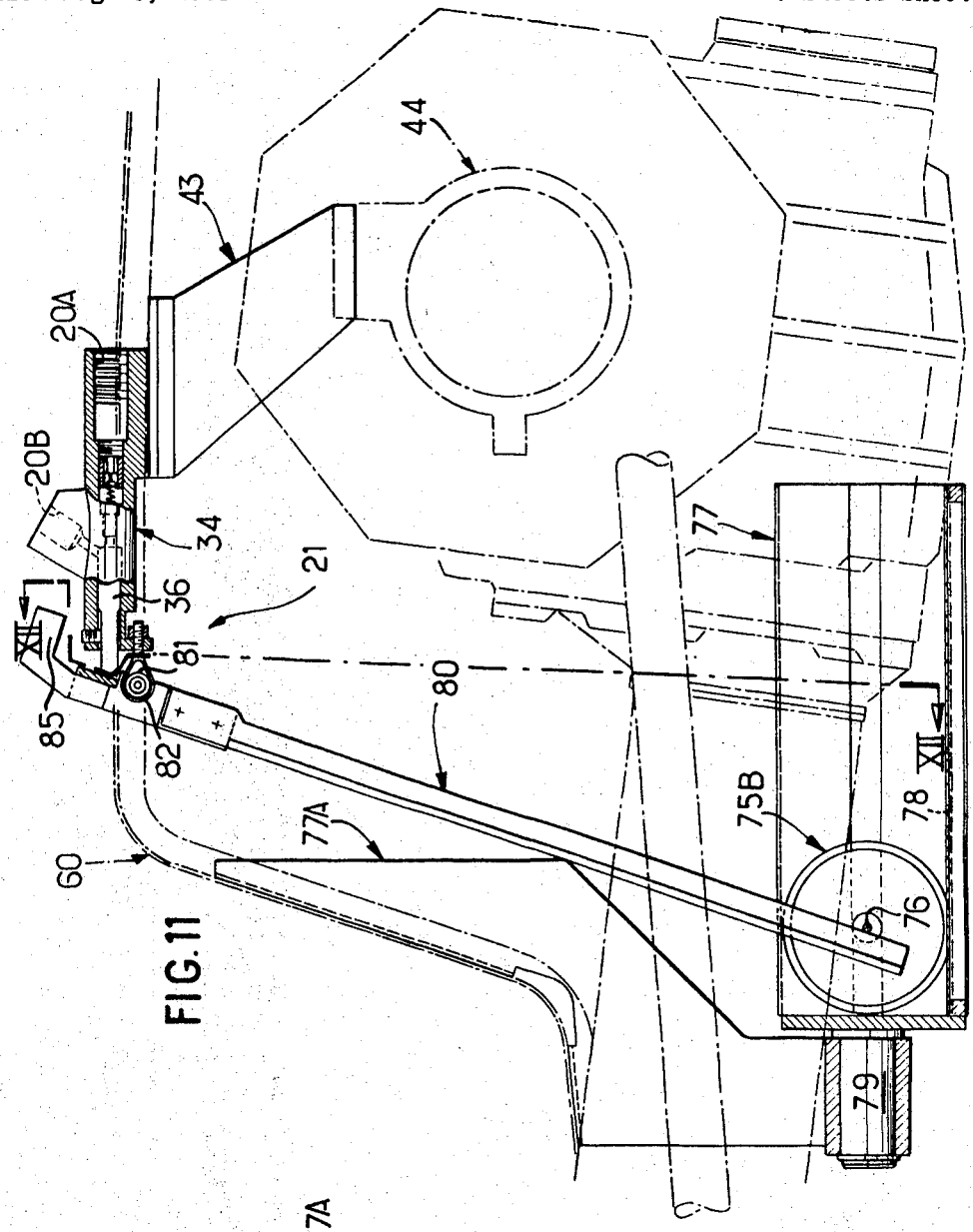

INVENTOR
JEAN GEORGES FRANCOIS
BY Young & Thompson
ATTYS.

United States Patent Office 3,531,164
Patented Sept. 29, 1970

3,531,164
BRAKING DEVICES FOR SELF-PROPELLED VEHICLES
Jean Georges François, Blanc Mesnil, France, assignor to Societe Anonyme Francaise du Ferodo, Paris, France, a corporation of France
Filed Aug. 8, 1968, Ser. No. 751,247
Claims priority, application France, Aug. 10, 1967, 117,474
Int. Cl. B60t 8/14, 8/18, 8/26
U.S. Cl. 303—24                           35 Claims

ABSTRACT OF THE DISCLOSURE

A rolling stock braking device comprising fluid operated braking devices having revolving elements rotating with the stock wheels and supplied with fluid from an actuating element, a braking corrector interposed between the actuating element and the braking device co-ordinated therewith and responsive to instantaneous vehicle deceleration or acceleration and to the dynamic load applied to the corresponding vehicle wheels, whereby the braking force applied to the elements is a function of the dynamic loading and the deceleration or acceleration, said function being represented by $$Z = aXY + bX + CY + d$$

wherein in magnitude and sign Z is the braking force applied to each revolving element, X is the vehicle deceleration, Y is the dynamic load on the vehicle wheel or wheels, and $a$, $b$, $c$, $d$ are structural parameters.

BACKGROUND OF THE INVENTION

Field of the invention

This invention relates to braking devices for self-propelled vehicles of the kind comprising an actuating element for delivery of fluid into a circuit connecting the said actuating element to the braking devices coordinated in a conventional manner with revolving elements entrained by the wheels of the said vehicle.

Description of the prior art

As known, and for obvious safety reasons, it is desirable to prevent premature locking of one of the axles of the vehicle during a braking action, and it would be necessary for this purpose, at any instant during braking action, for a constant ratio to be maintained for both axles of the vehicle between the braking moment applied to an axle and the dynamic loading of this axle, that is to say the static load of this axle under consideration of the load changes caused essentially by the acceleration or deceleration of the vehicle and the gradient or irregularities of the road. The curve representative of the braking moment to be applied to the rear axle of the vehicle as a function of the braking moment to be applied to the front axle, hereinafter referred to as the "braking curve," whilst making allowance for load transference occurring from one axle to the other during a braking action, is a parabola in the said ideal theoretical conditions in respect of identical proportionality between the braking moments and axle loads.

In an elementary braking circuit in which the actuating element supplies the braking pressure direct to the braking cylinders, a simple proportionality ratio only obtains between the braking moment applied to the rear axle and the braking moment applied to the front axle, a ratio of this kind being structurally defined for a given coefficient of friction of the friction linings operating in conjunction with the elements entrained by the wheels of the vehicle. The braking curve is then a simple straight line.

It has already been suggested to interpose a corrective device, referred to as a braking corrector, between the actuating element and the hydraulic circuit for operation of at least one of the axles of the vehicle, normally the rear axle; as the braking force increases, this braking corrector reduces the proportionality factor prevailing between the braking moment applied to the rear axle and that applied to the front axle, so that the representative curve of rear axle braking as a function of front axle braking is formed, for example, by a succession of rectilinear segments and thus tends to approximate the ideal parabola referred to above in an optimum manner; too restrained an application of the brakes of at least one of the axles of the vehicle results from the difference between the ideal parabola and the closely related curve obtained, in particular at low braking moments.

The main object of the present invention is to provide a braking device for self-propelled vehicles, comprising an actuating element for delivery of fluid into the actuating circuit connecting the said element to the braking devices co-ordinated in conventional manner with revolving elements entrained by the wheels of the vehicle, and for at least one of the said revolving elements, between the said actuating element and the braking device or devices co-ordinated with this revolving element, a braking corrector which in general manner renders it possible to effect optimum adaptation of the braking forces applied to the said elements to the load to which the corresponding wheel or wheels is or are subjected. This adaptation may be performed on any rolling element of the vehicle, that is to say either separately at each wheel, for each axle or set of axles, or for each possible sub-unit, such as a tractor and a trailer.

SUMMARY

According to the present invention, a braking corrector is arranged in such manner that the braking force applied to at least some of the braking devices co-ordinated with the elements solid in rotation with the wheels of the vehicle is a function of the dynamic loading applied to the wheels corresponding to these braking devices, and of the instantaneous deceleration imposed on the vehicle, this function being of the type:

$$Z = aXY + bX + cY + d$$

Z being the braking force,
X the deceleration,
Y the load, and
$a$, $b$, $c$, $d$, the structural parameters.

The braking curve obtainable with the braking device of the invention advantageously has the continuous configuration of the ideal parabola recalled above, and this independently of the longitudinal or vertical distribution of the static loadings of the vehicle, of the intensity of the braking action, of the gradient of the road, as well as of the retarding forces other than those caused by the braking operation applied to at least one of the wheels, and more particularly independently of the retarding forces caused by a fluctuation in the effectiveness of the brake or brakes co-ordinated with this wheel or wheels.

The parabolic configuration of the braking curve allows the latter to approach as close as possible to the theoretical parabola or to coincide therewith due to appropriate selection of the coefficients $a$, $b$, $c$, $d$; these may be such that Z becomes close to or identifiable with $aXY$.

Another object of the present invention is to provide a braking device whereby the following relationship is assured:

$$Z = \frac{R}{G^2} XY, \text{ within plus or minus } 10\%$$

in which R is the radius of the wheels in question and G2 the gravitational acceleration.

In a preferred form of embodiment, the braking corrector applied in the braking device comprises a pivoted lever subjected to the action of a force as a function of the deceleration of the vehicle, this force being applied to the lever at a distance from the pivot as a function of the load of the corresponding wheel or wheels of the vehicle, and it is the turning moment around the pivot imposed on the lever which is exploited to control the braking force applied to the revolving element or elements in question.

The lever is preferably subjected to the action of a weight displaceably arranged along the lever as a function of the dynamic loading of the wheel or wheels in question, the weight providing, by its inertia, the force applied to the lever as a function of the deceleration of the vehicle, and control is exercised over the braking force applied to each of the revolving elements in question through a pressure converter subjected to the turning moment applied to the lever, and interposed in the actuating circuit of the braking devices co-ordinated with the revolving elements.

The pressure converter preferably comprises body having a bore in which is slidably disposed a piston acted upon by the co-ordinated leverd on the one hand, and one the other hand by the action of the pressure prevailing in a chamber into which the bore opens, the chamber being connected either to the actuating element or to a reaction chamber of at least one of the brakes, and the lever is hingedly arranged on a pivot parallel to the transverse axis of the vehicle and is affected by the displacements of a weight free to move horizontally in response to the deceleration of the vehicle, any one of the elements of the lever-weight pair being linked at least unidirectionally to a suspended or sprung point of the vehicle, such as a point solid with the vehicle frame, the other of the elements of this pair being linked at least unidirectionally to the wheel or wheels in question.

The weight is preferably slidably disposed on the lever and is yoked at least unidirectionally to the chassis of the vehicle by a strap or the like, hingedly arranged on a transverse pin or spindle connected vertically to the chassis of the said vehicle.

As a variant, the weight simply bears against the rear of the lever relative to the direction of forward motion of the vehicle, and is displaceably arranged on a guide parallel to the longitudinal axis of the vehicle and connected to the chassis.

In the case of a vehicle having a pneumatic or hydraulic suspension system, the lever is formed by a cylinder element whose internal space is subjected to the thrust or pressure of the suspension, and by a piston element which carries the weight, and which is slidably arranged in a sealed manner in the cylinder element, against resilient return devices.

According to another particular feature of the invention applied to a hydraulic control system, the following relationship is preferably assure:

$$\frac{X1 E X2}{SDR} \leq 1 \text{ and } \#1$$

in which:

X1 is the weight of the counterweight expressed in newtons;

E is the degree of compression or crushing, as a function of load, of the resilient suspension interposed between the chassis of the vehicle and the wheel in question, expressed in m./newton, X2 is the efficiency (moment/pressure ratio) of the brake of this wheel expressed in $$\frac{\text{m. newton}}{\text{newton/m.}^2}$$

S is the cross section of the piston of the corrector expressed in m.$^2$;

D is the distance between the axis of the piston of the corrector and the pivoting axis of the lever, expressed in m.;

R is the radius of the wheel in question, expressed in m.

In order that the invention may be more fully understood some embodiments in accordance therewith will now be described by way of example, with reference to the accompanying drawings, in which:

BRIEF DESCRIPTION OF THE DRAWINGS

FIG. 1 shows diagrammatically a braking device;

FIG. 2 is an axial cross section along the line II—II of FIG. 3, looking in the direction of the arrows, of the braking corrector employed in the braking device of FIG. 1 for a given relative position of the chassis of the vehicle and of the axle with which this braking corrector is co-ordinated;

FIG. 3 is a side view of the braking corrector looking in the direction of the arrow III in FIG. 2, for another given relative position of the chassis and of the axle;

FIG. 4 is an enlarged scale view in axial cross section of the pressure converter in the braking corrector;

FIG. 5 is an axial cross section of the pressure converter of FIG. 4 along the line V—V looking in the direction of the arrows;

FIG. 6 is a cross section along the line VI—VI of FIG. 3 looking in the direction of the arrows;

FIG. 7 is a diagram showing the operation and the advantages of the braking device of the invention;

FIG. 8 is an axial cross section, similar to FIG. 2, and relates to one form of the component elements of the braking corrector;

FIG. 9 is a perspective view of an optional complementary element;

FIG. 10 is a partial cross section similar to FIG. 2, and relates to a variant applicable to another of the component elements of the braking corrector;

FIG. 11 is a view similar to FIG. 2 and relates to a variant of braking corrector;

FIG. 12 is a cross section of this variant along the broken line XII—XII of FIG. 1 looking in the direction of the arrows;

DESCRIPTION OF THE PREFERRED EMBODIMENT

Figure 4A:
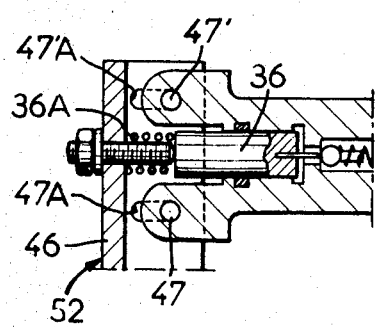
FIG. 4a is a partial view of an alternative pressure converter.

Referring to FIG. 1, a braking device has an actuating element 10 such as a master-cylinder with an actuating fluid reservoir 11 and affected by the action of a brake pedal 12 operable by the user, for delivery under pressure of the fluid into a pipe 13. The pipe 13 is connected at 14, on the one hand to the braking circuit 15, 16 of the brakes 17, 18 co-ordinated with the wheels of the front axle of the vehicle, and on the other hand to a pipe 19 connected to the inlet nozzle or orifice 20A of a housing 34 of a pressure converter 32 whose outlet orifice 20B is connected to the braking circuit 22 of the brakes 23, 24 co-ordinated with the rear axle of the vehicle.

The pressure converter forms one of the component elements of the braking corrector 21.

The brakes 17, 18, 23 and 24 are of the type comprising two shoes 25, 26 carried on a stationary bearer 27 and acted on by pistons 28, 29 sliding in opposite directions in a braking cylinder 30, which is an actuating cylinder.

Referring to FIGS. 2 to 5, the housing 34 of the pressure converter 32 has a bore 35 in which a piston 36 slides in sealed manner. At its internal extremity, the bore 35 opens into a chamber 37 in communication with the outlet orifice 20B. At its internal extremity, the piston 36 carries a finger 38 which, beyond the chamber 37, traverses with ample annular clearance a passage 39 establishing communication between this chamber 37 and a space 40 itself in communication with the inlet orifice 20A. In the space 40 is a ball valve 41 operable to close the passage 39 or to leave it open. The valve 41 is opened by the finger 38 carried by the piston 36, and is closed by a spring 42 bearing against a circlip or the like 42A set into an annular groove in the side of the space 40.

The housing 34 of the pressure converter 32 is carried by a bearer 43 secured to the trumpet housing 44 of the rear axle of the vehicle, shown diagrammatically by broken lines, and its median horizontal plane is shown at 44A.

At its external extremity, the piston 36 operates in conjunction with a finger or lifter 45 borne transversely by a lever 52 formed by a U-shaped element 46 hinged at 47 on the housing 34 and by a tube 33 solid with the element 46. The finger 45 is formed, for example as shown, by a screw acting in conjunction with a tapped drilling of the element 46 and its transverse position relative thereto can thus be adjusted in conjunction with a locknut 48.

At its upper part, the U-shaped element 46 is exposed to the action of a return spring 49 yoked by its other extremity to the bearer 43. The U-shaped element 46 is traversed on the other hand by a pin 50 which is engaged with a clearance at its other extremity in the bearer 43 and thus forms an abutment having a unilateral action.

On the tubular part 33 of the lever 52 is slidably arranged a counterweight or inertial element 53, fixed by a sleeve 53A to a small plate 54 having lateral lugs 55 in which are engaged, with clearance, the extremities 56 of a yoke or the like 57, which are bent over transversely at 56A (FIG. 6); the displacement of the weight 53 on the tubular lever 52 is downwardly restricted by a split pin 57A which traverses the lever.

The yoke 57 has its upper extremity 58, rounded for this purpose, engaged in a loop 59 carried by the coachwork or frame 60 of the vehicle.

In FIG. 2, the vehicle is assumed to be at rest with a maximum load on its rear axle: the weight 53 is in the low position and the tubular lever 52, which is affected by the action of the spring 49, is substantially vertical.

The valve 41 is open at the beginning of any braking action, with the vehicle in motion: in point of fact, as soon as the pedal is depressed, the deceleration caused by the front brakes 17, 18 at least, by virtue of its inertia, results in the weight 53 causing the lever 52 to pivot, and thus the displacement of the piston 36 and consequently of the finger 38; in practice, the spring 49 arranged to prevent flutter of the lever 52, intervenes so that the valve is just open at rest; the action of this spring on the response of the device will be ignored for the moment; it will be described in detail subsequently.

At the beginning of a braking action, a communication is thus established between the orifices 20A–20B of the pressure converter 32, that is to say between the master-cylinder 10 and the circuit 22 of the rear brakes 23, 24.

In the course of a braking action, the fluid impelled under pressure P1 by the master-cylinder 10 does not flow through the valve 41 except for as long as, for a pressure P2 in the chamber 37 which is ducted into the braking cylinders 20 of the rear brakes 23 and 24, there corresponds a force exerted on the internal extremity of the piston 36 which is smaller than a force F sufficient to cause a displacement of this piston towards the left of FIG. 4, i.e. in the direction of the arrow 65, against the action of the weight, 53, which displacement causes the closing of the valve 41.

Referring to FIG. 7, the braking moment CAV applied to the front axle of the vehicle is plotted as the abscissa, and the braking moment CAR applied to the rear axle of the vehicle is plotted as the ordinate.

The dynamic loads to which the front and rear axles of the vehicle are exposed at a given instant, will be referred to hereinafter as PAV and PAR, respectively.

At CN in FIG. 7, a theoretical parabola for a given normal loading condition represents the ideal braking moments CAR as a function of the braking moments CAV; the loading condition for which the ratio $PAR/PAV$ is a maximum corresponds to a curve $C_{MAX}$.

The distribution of the braking action chosen by construction and which would correspond to a braking action for which the pressure P2 applied to the rear braking circuit is equal to the pressure P1 applied to the front braking circuit, is such that the straight line D representing this distribution is tangential to the curve $C_{MAX}$; it is evident that the braking curves corresponding to a ratio $PAR/PAV$ smaller than its maximum value will be parabolic curves of the nature of the curve CN, the tangent to the origin of these curves having a smaller slope than that of D.

In the first instance it is assumed that, for a given vehicle, the braking distribution is that of the straight line D and that the loading condition is that of the curve CN. The curve CN is such that at each point of this curve corresponding to the deceleration G1, acting on the vehicle at a particular instant, the corresponding front and rear braking moments CAV and CAR are precisely proportional, respectively, to the loads PAV and PAR applied to the front and rear axles, respectively, at this instant.

As known, this curve CN which makes allowance for the evolution of the dynamic loads CAV, CAR as a function of the deceleration G1 of the vehicle, is governed by the following equations, where R is the wheel radius and G2 the gravitational acceleration $$CAV = PAV \cdot R \cdot \frac{G1}{G2}$$

$$CAR = PAR \cdot R \cdot \frac{G1}{G2}$$

As known moreover, the equation for the braking action on the vehicle as a whole, is as follows:

$$(CAV + CAR) = (PAV + PAR) R \frac{G1}{G2}$$

It is thus plain that it is sufficient in practice to establish $$CAR = PAR \cdot R \cdot \frac{G1}{G2}$$

for the representative braking point to appertain to the parabola CN.

The braking corrector renders this possible, since the force F defined hereinabove, which is equal and opposite to the force exerted by the lever 52 on the piston 36, and which determines the instant at which the valve 41 closes, is a function of the deceleration G1, by the weight 53 and of the load PAR on the rear axle by the position of this weight on the lever 52.

In point of fact, by virtue in particular of the braking action and of the gradient of the road, the dynamic load PAR on the rear axle varies: the chassis 60 of the vehicle is displaced relative to the trumpet housing 44 of the rear axle, and the weight 53 entrained by the chassis 60 occupies intermediate positions on the lever 62 between its extreme low position shown in solid lines in FIG. 2 and its extreme high position X in broken lines. In addition, since the weight 53 acts by its inertia in response to the deceleration G1, the lever 52 is exposed, around its pivot 47, to a turning moment which is a function of both the load PAR and the deceleration G1.

Thanks to the lever 52, the braking device thus renders it possible to engender a pressure P2 proportional to the product PAR.G1 in the chamber 37 of the pressure converter 32, and thus to have a braking moment CAR proportional to this product PAR.G1 on the rear axle.

So that the representative point of any braking action may be situated precisely on the curve CN, for the corresponding loading condition, it is sufficient, if:

L is the distance between the centre of gravity of the weight 53 and the pivot axis 47 of the lever 52, expressed in m.;

D the distance between the pivot axis 47 of the lever 52 and the axis of the finger 45 solid therewith, expressed in m.;

X1 the weight of the inertial element, expressed in newtons;

X2 the efficiency of the rear brakes, that is to say the ratio between the braking moment CAR developed by these brakes and the pressure applied to them, expressed in $$\frac{m.\ newton}{newton/m.^2}$$

S the cross section of the piston 36, expressed in m.²;

E the degree of compression, equal to the ratio $L/PAR$ and expressed in m./newton, of the suspension system coordinated with the rear axle of the vehicle as a function of the load PAR of this axle, to have the following relationship according to the invention;

$$\frac{X1EX2}{SDR} = 1 \quad (1)$$

In these conditions, and for a road surface of given adhesion, the maximum deceleration may be obtained, and this will be developed on all four wheels at the same time.

It may be desirable to establish preferential locking of the front and rear axle. To this end, it is sufficient to adjust the braking device to establish a braking curve slightly above or below the curve CN, respectively, and this braking curve at all events and unaffected by this adjustment, has a parabolic configuration enabling it to extend at a small distance from the curve CN throughout the length thereof.

This adjustment may be established in any appropriate manner; for example, in the case of proportionality between the rear braking moment CAR and the product $PAR \cdot G1$, the equality expressed by the Formula 1 above can be selected so that it is not complied with precisely; arrangements may be made moreover such that, between the rear braking moment CAR and the product $PAR \cdot G1$, there is no proportionality but a linear relationship, or in general in such manner as to establish a relationship of the type:

$$Z = aXY + bX + cY + d$$

in which:

Z represents the braking force applied to the axle in question;

X represents the deceleration of the vehicle;

Y the dynamic loading of the axle;

a, b, c, d structural parameters.

To this end, one may for example act on the length of the yoke 57, on the gradient of the lever 52 for the closing position of the vale 41, or incorporate an elastic device affecting the value of the force F specified hereinabove.

In particular, when the relationship (1) hereinabove is satisfactory, the relationship $Z = aXY$ (2) obtains for each axle, and with $a = R/G2$, the conditions specified above are re-established, so that the braking curve is the ideal parabola.

As a function of the aforesaid adjustment in particular, the relationship (2) may apply with a precision of no more than plus or minus 10%.

It can be pointed out that if preferential locking of the front axle is chosen, the deceleration no longer rising when this axle is locked, the braking action applied to the rear axle remains constant, so that locking of the rear axle is never reached and this irrespective of the force then exerted on the brake pedal.

In this case, the braking corrector thus also prevents locking of the rear axle.

As has been stated hereinabove, the spring 49 which prevents flutter of the lever 52, acts so that the valve 41 is open at rest. This spring has an effect on the value of the force F which becomes manifest by a pressure $P2 + DP2$ in the chamber 37 of the converter 34 slightly higher than the pressure P2 which would be engendered therein by the action of the weight 53 alone. The effective clamping pressure applied to the shoes 25, 26 of the rear brakes 23, 24 is equal moreover to the pressure $P2 + DP2$ delivered by the converted 34 minus a pressure $DP'2$ required to work against shoe retractor springs when used.

By ringing the changes on these return springs and the spring 49, it is thus possible to make $DP'2 = DP2$, which may cancel the action of the spring 49 if it is considered to represent an interference factor.

It has been seen that, subject to definite conditions, the representative point of any braking action is situated or evolves on a parabola of the type of the curve CN; this is possible only if all the points of the braking curve are "accessible" to the corrector, which would not be the case if, allowing for the initial settings, the vehicle were to be overloaded; in this case, the braking curve of the kind CA in FIG. 7, that is to say is a parabolic curve the tangent of which to the origin has a higher gradient than that of the straight line D; in this case, this curve would not intervene except beyond the point A at which the straight line D intersects the curve CA; up to this point, the parabola CA would be replaced by the straight line D itself, without any change for the other points of this curve.

It is important to emphasize that these results are advantageously unaffected by the loads PAV and PAR on the front and rear axles of the vehicle, unaffected by the braking moment CAV applied to the front axle, and unaffected by the gradient of the road intervening in the guise of an acceleration or deceleration.

In FIG. 7, the braking curves CA, $C_{MAX}$ and CN are superimposed, respectively, on the corresponding ideal theoretical curves L, L', L''.

As will be understood, the hinging of the yoke 57 on the loop carried by the chassis enables the yoke to match the relative transverse displacements between the chassis 60 and the rear axle, in optimum manner. Also the pin 50 at the upper part of the U-shaped element 46 itself forming the upper part of the lever 52, advantageously limits the angular deflection thereof.

Referring to FIG. 4a, the pivot 47 of the lever 52 cooperates with an eye 47a of the U-shaped element of this lever, below the piston 36, and a similar arrangement 47', 47'A is adopted above the piston 36, in co-operation with a spring 36A interposed between the piston 36 and the U-shaped element 46. Thus the braking corrector is operative in the case of forward motion of the vehicle as well as in rearward motion.

FIG. 8 shows a partial view of a variant of the weight 53 on the tubular lever 52, in which the weight 53 is solid with a washer 67 whose inner outline 67A is curved down towards the lower extremity of the lever 52. The internal diameter of this ring is arranged to be adequate so that after installing the weight 53 on the lever 52, an annular clearance J remains between this outline 67A and the lever 52. During uniform displacement of the vehicle, the stepped washer 67 allows sliding in both directions, that is to say upwards and downwards, of the weight 53 on the lever 52.

By contrast, during a braking action, owing to the inertial forces developed by the weight 53 and to the vertical offset of the washer 67 relative to the centre of gravity of the weight 53, the latter tips slightly relative to the axis of the lever 52, and its downward sliding movement on the lever 52 is braked by the wedging action then intervening between the stepped or chamfered washer 67 and the lever 52 owing to the chamfer of this washer; the upward sliding displacement of the weight 53 is not affected by wedging action, occurring under the action of a load transfer.

This arrangement has the advantage of preventing any accidental dropping of the weight 53 on a rough road. An analogous result may be obtained by replacing the chamfered washer 67 by a washer of high-friction material.

According to FIG. 9, an endpiece 68 is engaged on the lower extremity of the tubular lever 52, the endpiece carrying a flat blade 69 disposed transversely of the longitudinal axis of the vehicle.

The fluid flow acting on this blade 69 introduces a complementary speed parameter which advantageously renders it possbile to correct the braking distribution between the moments applied to the front and rear axles of the vehicle, as a function of the vehicle speed.

In the example illustrated, the force developed by this fluid flow is deducted from that caused by the inertia of the weight 53 and thus reduces the braking moment exerted on the rear axle of the vehicle at high speeds.

The blade 69 being fastened to the lever 52, the corrective force it introduces is independent of the load CAR on the rear axle.

According to a variant (not shown) the blade 69 is fastened to the weight 53 and, in this case, the correction it introduces depends on the load CAR on the rear axle.

FIG. 10 relates to a variant applied to the fitting of the yoke 57 on the chassis 60 of the vehicle, in which the upper part or pivot spindle 58 of the yoke 57 is engaged in a core 70 which rolls on a rolling plane 71 solid with the chassis 60.

By this arrangement, imperfect positioning on assembly may be taken up; moreover, the pivot pin 58 of the yoke 57 on the chassis 60 follows the forward displacement of the weight 53 during a braking action and by virtue of this fact remains vertically (in plumb) with the centre of gravity of this weight. The return force engendered by the swinging pendulum motion of the weight 53 about its articulation 58 when the lever 52 is moved away from the vertical, may thus be cancelled advantageously, which return force may modify the action of the deceleration.

An embodiment structurally unaffected by a pendulum motion of this nature will now be described with reference to FIGS. 11 and 12.

According to this variant, the weight 53 is replaced by two rollers 75A, 75B interconnected by a spindle 76 and arranged in a cage 77 the lower surface of which forms a horizontal rolling path 78 parallel to the longitudinal axis of the vehicle. The cage 77 is hinged on a bearer 77A solid with the vehicle chassis 60, by a horizontal pivot 79 parallel to the longitudinal vehicle axis.

The rollers 75A, 75B simply bear with their spindle 76 against a lever 80 which replaces the aforesaid tubular lever 52.

The lever 80 is articulated by a balljoint 81 on a ring 82 solid with the housing 34 of the braking corrector, comprising a ball valve interposed between an inlet orifice 20A and an outlet orifice 20B, the valve being opened by action of the piston 36. At its outer extremity, this piston 36 operates in direct conjunction with the lever 80 which, beyond its articulation 81, carries a counterweight 85, balancing the inertial forces caused by the lever 80 itself.

The operation of this variant is analogous in all respects to that previously described with respect to FIGS. 2 and 3; during a braking action, the rollers 75A, 75B are displaced towards the front and the resulting slope of the lever 80 causes penetration of the piston 36 into the housing 34; if the chassis 60 lifts relative to the axle 44, the cage 77 is entrained by the chassis, and the spindle 76 of the rollers 75A, 75B is then displaced along the lever 80.

The rolling without slipping of the rollers 75A, 75B on the rolling path 78 renders it possible to ensure satisfactory efficiency.

As previously, the balljoint 81 of the lever 80 and the pivot 79 of the cage 77 enable the device to adapt itself to the relative motions of the vehicle chassis 60 and of the rear axle 44.

According to a variant (not shown) the rolling path or guide of the rollers 75A, 75B is formed by preferably curved rails which at either side of the bend or elbow, comprise a working section and a hooking section. The working section operates in conjunction with the rollers, and the hooking section is fastened to the bodywork or frame of the vehicle by a linkage adjustable in length after having slidingly traversed, for guiding purposes, the housing 34 of the pressure converter 32 solid with the rear axle.

Figure 13:
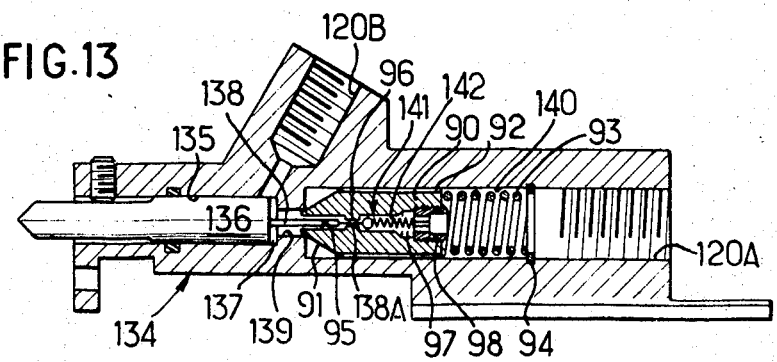
FIG. 13 is an enlarged axial cross section of another variant of the pressure converter in the braking corrector.

FIG. 13 shows an embodiment of the pressure converter employed in the braking corrector. The housing 134 of the converter, as previously, comprises a piston 136 sliding in a bore 135 extended by a chamber 137 which is in communication, on the one hand, with an outlet orifice 120B$m$ and on the other hand through a passage 139 and a space 140, with an inlet orifice 120A.

In the space 140 is slidably arranged a core 90 whose conical head 91 operates in conjunction with the opening of the passage 139 into the space 140. At its periphery, the core 90 has longitudinal groove 92, and opposite to the conical head 91 is affected by the action of a spring 93 bearing against a circlip or the like 94 housed in a groove in the case 134.

The core has an axial passage 95 which, beyond a constriction 96, forms a chamber 97 in which is a ball valve 141 whose spring 142 bears against a sleeve 98 screwed into the core 90.

On its inner extremity, the piston 136 carries a finger 138 engaged with wide clearance into the passage 95 of the core 90. The finger 138 has an extension 138A which, beyond the constriction 96, is arranged to open the valve 141. Thus the valve devices interposed as previously between the inlet orifice 120A and the outlet orifice 120B are operated to open during insertion of the piston 136 into the case 134, in two separate consecutive stages: a first stage corresponding to the opening of the valve 141 by the extension 138A of the finger 138 carried by the piston, and a second stage corresponding to the entrainment of the core 90 by the finger 138 coming to bear against the constriction 96, which entrainment causes the conical head 91 to clear the passage 139.

During the first stage, the flow of fluid between the inlet orifice 120A and the outlet orifice 120B occurs at a small rate of flow, and during the second stage, occurs at a higher rate of flow.

Figure 14:
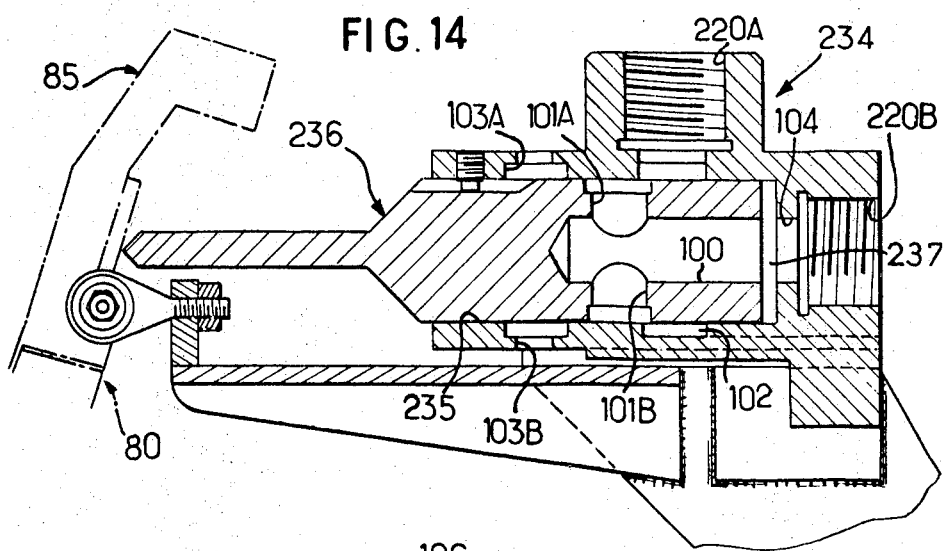
FIG. 14 is an axial cross section of another embodiment of the pressure converter.

FIG. 14 shows an embodiment of pressure converter which may be adopted where a source of pressure allowing of a certain consumption of fluid during a braking action is available on the vehicle.

This source of pressure is connected to the inlet orifice 220A of a housing 234. A piston 236 slides in a bore 235 of the housing and itself has an axial bore 100 and two transverse drillings 101A, 101B. The bore 235 in which the piston 236 slides, is in communication, on the one hand, with the inlet orifice 220A through an annular groove 102 in the housing 234 abreast of the said inlet orifice, and on the other hand with the outside or with a collecting space through two lateral drillings 103A, 103B; beyond the piston 236, the bore 235 forms a chamber 237 which is in communication with the outlet orifice 220B through an orifice 104 abreast of the opening of the bore 100 of the piston 236.

As previously, the piston 236 is affected by the action of a lever 80 analogous to that described previously.

The source of pressure connected at 220A is normally ready to deliver into the braking circuit, connected to 220B, through, consecutively, the annular groove 102 the passages 101A, 101B, the bore 100 and the passage 104.

When the pressure in the chamber 237 is sufficient, it repels the piston 236 towards the left of FIG. 14, against the lever 80 by a distance sufficient for the drillings 101A, 101B of the same not to be aligned any longer with the annular groove 102. No communication is then present between the source of pressure and the braking circuit. From then on, the pressure in the chamber 237 balances the action of the lever 80. If the action of the lever diminishes, the piston 236 continues its displacement towards the left, closes the inlet orifice 220A and places the orifice 220B in communication with the discharge orifices 103A, 103B of the housing 234. From then on, the pressure in the chamber 237 diminishes in its turn, which allows the lever 80 to return the piston 236 towards the rear, with repeated closure of the discharge orifices 103A, 103B since actuating fluid is fed in again; a new state of balance is then established between the pressure in the chamber 237 and the action of the lever 80.

The discharge orifices 103A, 103B are advantageously sufficiently small to prevent pumping.

Figure 15:
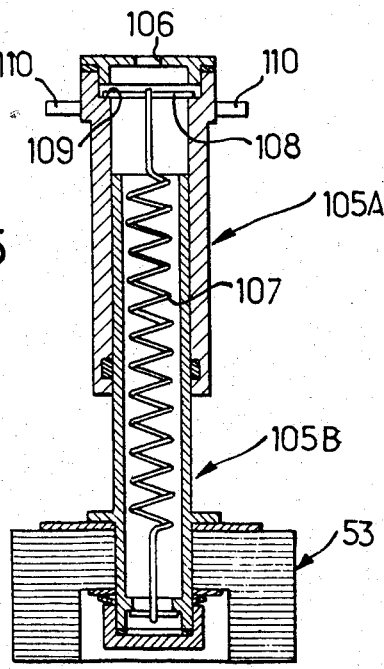
FIG. 15 is an axial cross section of another embodiment of one of the elements employed in the braking corrector.

FIG. 15 shows an embodiment in which the load of the rear axle of the vehicle is represented by a pressure, specifically when the vehicle has a hydraulic or pneumatic suspension system. The lever of the braking corrector is formed by a cylinder element 105A into which the suspension pressure is conveyed through an opening 106, and by a piston element 105B sliding in sealed manner in the cylinder element against a spring 107 yoked to a transverse pin 108 which bears against a shoulder or step 109 of the cylinder element which in turn has lateral journals 110 for articulation of the lever on the chassis of the vehicle, and the piston element 105B carries the weight 53.

The suspension pressure conveyed into the cylinder element 105A acts on the piston element 105B against the spring 107. The position of the weight 53 is thus a function of the load on the axle in question, as previously.

Figure 16:
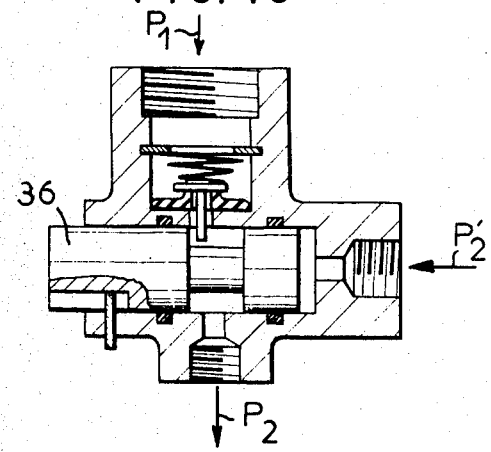
FIG. 16 is an axial section of another embodiment of the pressure converter; and, FIG. 17 is a diagram of a brake to which the pressure corrector of FIG. 16 may be applied.

As a variant, diagrammatically shown in FIG. 16, the control pressure acting against the lever of the braking corrector is not, as shown hitherto, the pressure P2 applied to the rear brakes, but a pressure P'2 reflecting the braking moment to which the rear brakes are then exposed, which are then clamped by a pressure P2 obtained by placing the actuating circuits of these brakes in communication or not with a source of pressure P1 through the device, depending on whether the action of the control pressure P'2 on the piston 36 is exceeded or not by that of the lever 52. An arrangement of this kind renders it possible to establish the relationship $$CAR = PAR.R.\frac{G1}{G2}$$

or analogous relationships, irrespective of the fluctuations in the efficiency of the rear brakes.

Figure 17:
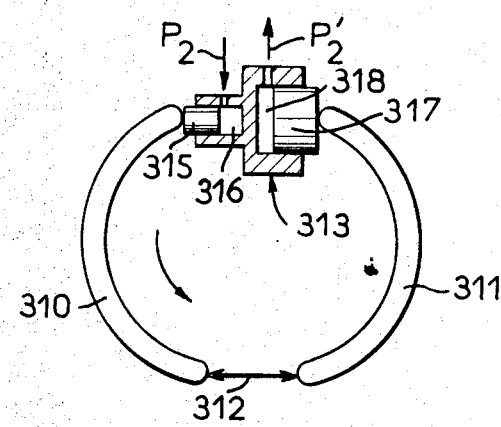

A brake is shown diagrammatically in FIG. 17, to which may be applied the construction of FIG. 16. This brake comprises two shoes floating 310, 311 between which are interposed, a coupling rod 312 at one of their extremities, and an actuating device 313 at the other of their extremities. The latter comprises, for the shoe 310, a piston 315 slidably disposed in an actuating chamber 316 to which the pressure P2 is applied, and for the shoe 311 a piston 317 slidably arranged in a reaction chamber 318 supplying the pressure P'2.

The conversion devices interposed between the corrective force F and the braking circuit of the axle may be electrical, magnetic, electromagnetic, mechanical, pneumatic or of any other form.

Although the present invention has been described in respect of a braking device in which each of the axles has been dealt with separately, it may be applied wheel by wheel, each being considered separately, or set of wheels by set of wheels.

It may be advantageous to incorporate a calibrated orifice in the circuit 22 of the rear brakes, to control the speed of pressurisation of these brakes.

It may be advantageous for the volume swept by the piston 36 to represent an appreciable fraction of the total volume of the braking circuit co-ordinated with the rear axle; this arrangement in point of fact advantageously allows of optimum automatic adjustment by the piston 36, solely by means of its displacements, of the pressure in the said braking circuit, whether this pressure is excessive, in which case a return motion of the piston 36 towards the left in FIG. 4 assures a reduction in this pressure, or whether this pressure is too low, in which case a forward motion of the piston 36 assures an increase in this pressure without resorting to an opening of the valve 41.

I claim:

1. A braking device for rolling stock such as self-propelled vehicles, comprising for each stock road wheel a revolving element fast in rotation with said wheel, an actuating element supplying pressure fluid to a fluid circuit including at least one of said revolving elements, a braking corrector between said revolving element and said actuator element, said braking corrector comprising a hollow body and a piston which slides in said hollow body and which delimits the volume of said fluid circuit between said braking corrector and said revolving element, and inertial control means which is in abutment against said piston and which is, at any instant, responsive to the rate of change of speed of said vehicle and to the dynamic load applied to said wheel, so that the braking force applied to said revolving element is a function of said dynamic load and said rate of change of speed and is represented by the formula:

$$Z = aXY + bX + cY + d$$

wherein in magnitude and sign Z is the braking force applied to said removing element, X is the vehicle deceleration, Y is the dynamic load applied to said wheel and $a, b, c$ and $d$ are structural parameters.

2. A braking device according to claim 1, wherein the constans $a, b, c, d$ are determined by construction in such manner as to establish the following relationship:

$$Z \# aXY$$

3. A braking device according to claim 1, wherein the constant $a$ is equal to the ratio $R/G2$, in which R is the radius of the vehicle wheel in question and G2 the gravitational acceleration.

4. A braking device according to claim 1 wherein the relationship is obtained:

$$Z = \frac{R}{G2} XY \text{ within plus or minus } 10\%$$

5. A braking device according to claim 1 wherein the inertial control means comprises a pivoted lever responsive to the action of a force which is a function of the vehicle deceleration and is applied on the lever at a distance from the pivot which is a function of the load of said wheel, and the turning moment on the lever about the pivot is employed to control the braking force applied to the revolving element in question.

6. A braking device according to claim 5 wherein the lever of the braking corrector is responsive to the action of a weight displaceable along the lever as a function of the dynamic loading of the wheel, the inertia of the weight providing the force which is a function of the vehicle deceleration and is applied to the lever, and control is exercised over the braking force applied to said revolving element through a pressure converter responsive to the turning moment on the said lever and interposed in the control circuit of the braking device co-ordinated with the revolving element.

7. A braking device according to claim 6 wherein the pressure converter comprises a housing having a bore in which slides a piston responsive to the action of the lever of the braking corrector and to the action of the pressure prevailing in a chamber into which the bore opens, and the lever is pivoted about an axis parallel to the transverse vehicle axis and is responsive to the motions of a weight free to be displaced horizontally in response to the vehicle deceleration, either of the elements of the lever-weight pair being linked at least unidirectionally to one of a suspended or sprung point of the vehicle, such as a point solid with its chassis, the other of the elements of this pair being linked at least unidirectionally to the wheel.

8. A braking device according to claim 7, wherein the chamber is connected to the actuating element.

9. A braking device according to claim 7 wherein the chamber is connected to the reaction chamber of at least one of the brakes.

10. A braking device according to claim 7 wherein the pressure converter comprises a second chamber, into which the bore also opens, the second chamber being connected to the actuating element through a passage controlled by the piston and to the control or actuating circuit of the braking device co-ordinated with the revolving element.

11. A braking device according to claim 10 wherein the second chamber is identical to the first.

12. A braking device according to claim 10 wherein the second chamber is a groove in the piston.

13. A braking device according to claim 10 wherein the passage comprises a valve.

14. A braking device according to claim 13, wherein the valve is of the ball type and is urged towards the closing position by a spring and towards the opening position by a finger borne by the co-ordinated piston.

15. A braking device according to claim 13 wherein the valve is of the slide type in the body of the piston.

16. A braking device according to claim 7 wherein the weight slides on the co-ordinated lever and is yoked at least unidirectionally to the vehicle chassis by a stirrup or yoke articulated on a transverse spindle linked to the chassis vertically.

17. A braking device according to claim 16 wherein the spindle is free to be displaced horizontally.

18. A braking device according to claim 7 wherein the weight simply bears against the rear of the lever in the direction of forward motion of the vehicle.

19. A braking device according to claim 7 wherein the weight is displaceable on a guide parallel to the longitudinal axis of the vehicle and connected to the vehicle chassis.

20. A braking device according to claim 6, wherein with a vehicle having a pneumatic or hydraulic suspension system, the lever is formed by a cylinder element whose internal space is subjected to the pressure of the suspension system, and by a piston element which carries the weight and slides in sealed manner in the said cylinder element against resilient return devices.

21. A braking device according to claim 5, wherein the lever is articulated by a balljoint device.

22. A braking device according to claim 7, wherein the lever is articulated with tolerance at two points at either side of the piston.

23. A braking device according to claim 16, wherein the stirrup or yoke is articulated by a balljoint device.

24. A braking device according to claim 19, wherein the guide of the weight is pivoted on the vehicle chassis round a spindle parallel to the longitudinal vehicle axis.

25. A braking device according to claim 19, wherein the guide of the weight slides in a sheath solid with the axle.

26. A braking device according to claim 19 wherein the guide of the weight is vertically adjustable in respect to the vehicle chassis.

27. A braking device according to claim 5, wherein a small plate is secured to the lever and is disposed transversely of the longitudinal vehicle axis.

28. A braking device according to claim 16, wherein the weight has a washer engaged with tolerance on the lever, and the washer has its inner outline bent over in the direction of the lower extremity of the lever.

29. A braking device according to claim 16 wherein the weight is engaged with a clearance on the lever and has a washer of high-friction material engaged rubbingly on the lever.

30. A braking device according to claim 13, wherein the lever is acted upon by a return spring.

31. A braking device according to claim 30, wherein at rest the tension of the return spring holds the valve open.

32. A braking device according to claim 30 wherein for a wheel having a brake whose shoes are subjected to the action of a return spring, the tension of the return spring of the lever balances the tension of the return spring of the shoes, when at rest.

33. A braking device according to claim 13, wherein the valve comprises two valve elements consecutively actuated in the direction of opening by the finger on the piston, being a valve for a low rate of flow and a valve for a high rate of flow.

34. A braking device according to claim 33, where for this purpose, the low rate of flow valve is in a sliding core, itself forming a valve, and the finger on the piston has a shoulder for entrainment of the core after opening of the low rate of flow valve.

35. A braking device according to claim 7, wherein the following relationship is assured:

$$\frac{X1EX2}{SDR} \leq 1 \text{ and } \#1$$

in which
X1 is the weight of the inertial element expressed in newtons,
E is the degree of compression, as a function of the load, of the elastic suspension system interposed between the vehicle chassis and the wheel, expressed in m./newton,
X2 is the efficiency of the brake of this wheel, that is to say expressed in $$\frac{\text{m./newton}}{\text{newton/m.}^2}$$

the ratio between the braking moment developed by this brake and the actuating pressure applied to this brake,
S is the cross section of the piston expressed in m.²,
D the distance between the axis of the piston and the pivot of the lever, expressed in m.², and
R the radius of the wheel expressed in m.

References Cited
UNITED STATES PATENTS

| | | | |
|---|---|---|---|
| 2,924,306 | 2/1960 | Martin. | |
| 2,953,413 | 9/1960 | Jankauskas | 303—24 |
| 3,297,368 | 1/1967 | Cumming | 303—24 X |
| 3,383,139 | 5/1968 | Chevreux | 303—24 |

MILTON BUCHLER, Primary Examiner

J. J. McLAUGHLIN, Jr., Assistant Examiner

U.S. Cl. X.R.

303—6, 21, 22